US009643362B2

(12) United States Patent
Amadio et al.

(10) Patent No.: US 9,643,362 B2
(45) Date of Patent: May 9, 2017

(54) FULL COLOR THREE-DIMENSIONAL OBJECT FABRICATION

(71) Applicant: Microsoft Corporation, Redmond, WA (US)

(72) Inventors: Louis Amadio, Sammamish, WA (US); Kristofer N. Iverson, Redmond, WA (US); Jesse D. McGatha, Sammamish, WA (US); Yulin Jin, Redmond, WA (US); Shanen Jon Boettcher, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 557 days.

(21) Appl. No.: 13/910,958

(22) Filed: Jun. 5, 2013

(65) Prior Publication Data

US 2014/0277661 A1 Sep. 18, 2014

Related U.S. Application Data

(60) Provisional application No. 61/786,377, filed on Mar. 15, 2013.

(51) Int. Cl.
*B29C 67/00* (2006.01)
*G05B 19/4099* (2006.01)

(52) U.S. Cl.
CPC ...... *B29C 67/0088* (2013.01); *B29C 67/0055* (2013.01); *G05B 19/4099* (2013.01); *G05B 2219/49014* (2013.01)

(58) Field of Classification Search
None
See application file for complete search history.

(56) References Cited

U.S. PATENT DOCUMENTS

| 2,767,093 | A | * | 10/1956 | Gustave | G03F 5/24 355/132 |
| 5,079,563 | A | * | 1/1992 | Starkweather | B41J 2/2132 347/41 |
| 5,781,194 | A | * | 7/1998 | Ponomarev | G06T 17/10 345/424 |
| 6,129,872 | A | * | 10/2000 | Jang | B29C 41/36 264/245 |
| 6,165,406 | A | * | 12/2000 | Jang | B29C 67/0081 264/308 |

(Continued)

OTHER PUBLICATIONS

Zhou, Chi, et al. "Development of Multi-Material Mask-Image-Projection-Based Stereolithography for the Fabrication of Digital Materials." Annual Solid Freeform Fabrication Symposium, Austin, TX. 2011.*

(Continued)

*Primary Examiner* — Christopher E Everett

(57) ABSTRACT

The subject disclosure is directed towards technology managing three-dimensional object fabrication in full color. In order to transform the object's model into an instruction set for a fabrication device, a fabrication manager computes color values corresponding to geometry within a later of the object's model. After determining an amount of each colored material to deposit, the fabrication manager generates coordinated instructions configured to deposit a combination of colored materials according to the geometry and efficiently transitioning between colored materials during object fabrication.

20 Claims, 10 Drawing Sheets

(56) References Cited

U.S. PATENT DOCUMENTS

| | | | | |
|---|---|---|---|---|
| 6,280,784 | B1* | 8/2001 | Yang | A21C 11/163 425/112 |
| 6,401,002 | B1* | 6/2002 | Jang | G05B 19/4099 204/192.15 |
| 6,405,095 | B1* | 6/2002 | Jang | B29C 67/0081 264/308 |
| 7,991,498 | B2* | 8/2011 | Kritchman | B29C 67/0059 101/171 |
| 2002/0079601 | A1 | 6/2002 | Russell et al. | |
| 2002/0167101 | A1 | 11/2002 | Tochimoto et al. | |
| 2004/0225398 | A1* | 11/2004 | Silverbrook | B22F 3/008 700/119 |
| 2005/0081161 | A1* | 4/2005 | MacInnes | G06F 17/5004 715/765 |
| 2006/0022379 | A1* | 2/2006 | Wicker | B29C 67/0066 264/255 |
| 2010/0188416 | A1* | 7/2010 | Hayes | G06T 15/503 345/592 |
| 2010/0327479 | A1 | 12/2010 | Zinniel et al. | |
| 2011/0205583 | A1* | 8/2011 | Young | B29C 67/0088 358/1.15 |
| 2011/0222081 | A1* | 9/2011 | Yi | G06T 17/00 358/1.9 |
| 2013/0096708 | A1* | 4/2013 | Danks | B29C 67/0088 700/98 |
| 2013/0209600 | A1* | 8/2013 | Tow | G01N 35/1011 425/375 |
| 2013/0295212 | A1* | 11/2013 | Chen | B29C 67/0088 425/150 |
| 2014/0031967 | A1* | 1/2014 | Unger | B29C 67/0088 700/119 |
| 2014/0067106 | A1* | 3/2014 | Makeig | B29C 67/0088 700/98 |
| 2014/0176535 | A1* | 6/2014 | Krig | G06T 15/04 345/419 |
| 2015/0165690 | A1* | 6/2015 | Tow | A43B 7/28 700/119 |

OTHER PUBLICATIONS

Gower, Malcolm Charles, "Industrial applications of laser micromachining," Optics Express, vol. 7, pp. 56-67 (2000).*
"International Search Report and Written Opinion Issued in PCT Patent Application No. PCT/US2014/026480", Mailed Date: Jun. 17, 2015, 10 Pages.

* cited by examiner

FULL COLOR THREE-DIMENSIONAL OBJECT FABRICATION

CROSS-REFERENCE TO RELATED APPLICATION

The present application claims priority to U.S. Provisional Patent Application Ser. No. 61/786,377, filed Mar. 15, 2013.

BACKGROUND

There are a number of processes for creating a digital model and producing a three-dimensional solid object of virtually any shape from that model. These processes may be referred to as 3D printing, rapid prototyping, fused-filament or additive manufacturing, and/or the like. One technology involves curing ultraviolet (UV) sensitive resin with a UV light, which may be either a laser or a projection. To print an object, that object is primed with a layer of resin—either by lowering the object into a vat such that a minute layer remains above the object or by dipping the object into a vat until just short of the bottom. The UV light cures the resin into the desired shape for that layer. Because this technology restricts the number of resins to one resin, an object with more colors cannot be fabricated.

Another technology that adds material, such as a thermoplastic filament, in layers involves extruding the thermoplastic filament through printing tool head, which is heated to melt plastic filament such that the melted filament can be moved in both horizontal and vertical directions to fill successive geometries, building each layer, one atop the next. The material hardens almost immediately after extrusion from the nozzle. Because this technology provides a single extruder head for each color and no means for color mixing, a full color three-dimensional object can be fabricated.

These technologies have single or dual-color capabilities, but lack the capability, in terms of, for example, mechanical components, to represent a full gamut or gradations of colors in a color space. In addition, none of the conventional technologies are capable of determining exactly which color to produce because, for one reason, translating a full-color model into machine instructions that generate the full color gamut on the device. Limitations imposed by such conventional technologies, including but not restricted to those mentioned above, inhibit full color three-dimensional object fabrication.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards controlling full color three-dimensional object fabrication by managing usage of multiple colored source materials. In one aspect, an instruction set may be generated for an apparatus configured to fabricate multi-colored objects. The instruction set comprises instructions for coordinating a first mechanism and a second mechanism during fabrication. When executed by components of the apparatus, for example, the instruction set causes the first mechanism to move according to the object's three-dimensional geometry while depositing colored materials using the second mechanism. In another aspect, these instructions enable seamless transitioning between colors by preparing a next color while depositing material for a current color.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
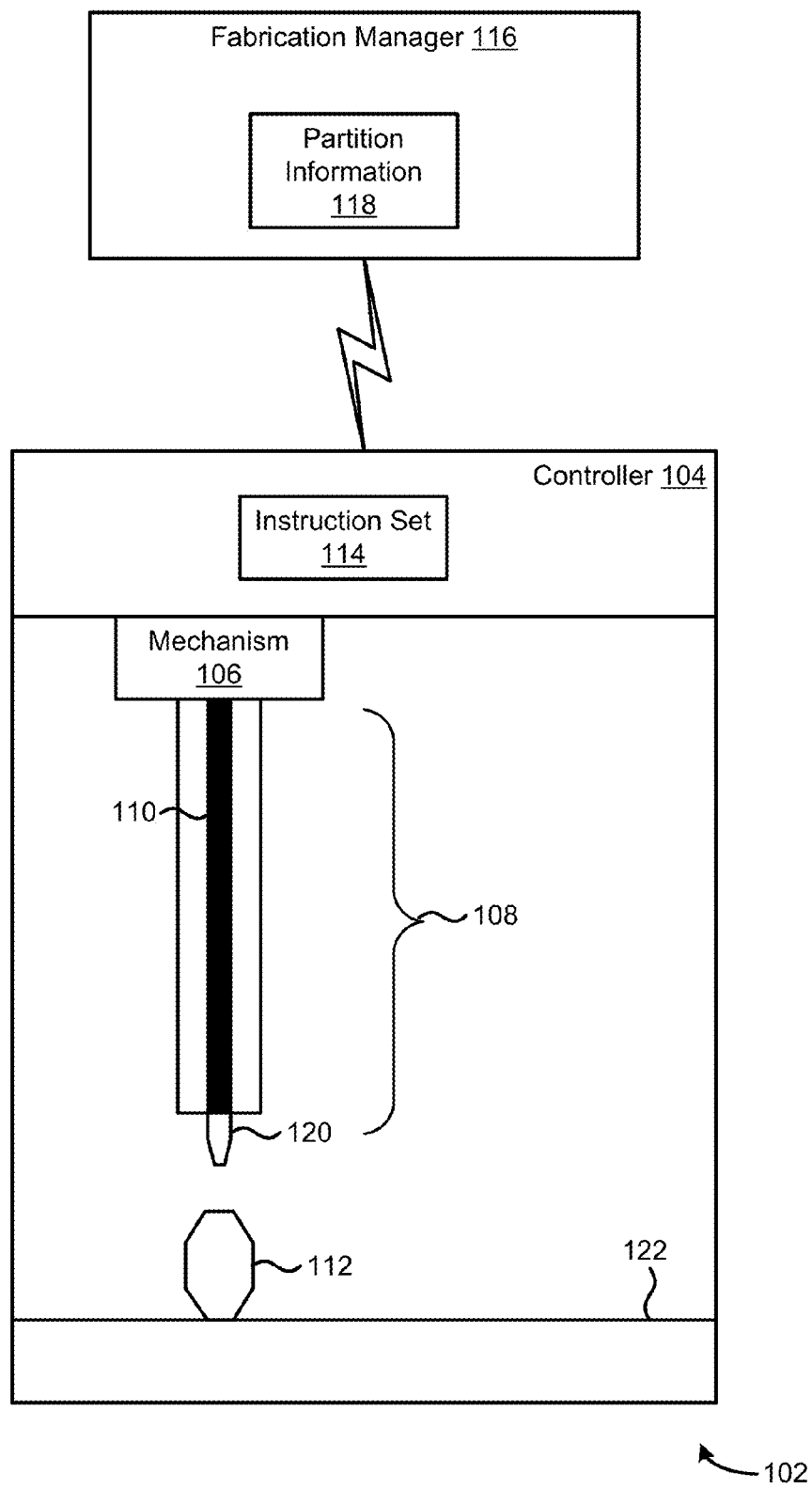
FIG. 1 is a block diagram illustrating an example apparatus for transforming a three-dimensional model into instructions for mixing colored materials according to one or more example implementations.

Various aspects of the technology described herein are generally directed towards a fabrication manager configured to generate an instruction set, which when executed, causes an apparatus to fabricate a full color three-dimensional object using multiple colored materials. Hence, in one or more embodiments, such an apparatus may be referred to as a fabrication device.

To represent the object's geometry, the fabrication manager partitions the object's model (e.g., a mesh model) into layers, decomposes each layer into geometric elements (e.g., polygons), and projects each element onto the layer's plane forming the object's shell. After determining an approximate minimum or smallest amount of colored material capable of being deposited at a given instance, the fabrication manger uses that amount to define addressable units on the object's shell such that each unit represents a color for a specific geometric element or a portion thereof. These units enable color changes to be identified, providing seamless transitioning between multiple colors during fabrication. These units also allow the fabrication device to extrude different volumes of materials at any given instance. Color resolution also may increase or decrease depending on unit size. This technique may be applied to the object's entire volume, including the outer shell, particularly, if translucent materials are in use such that interior portions of the object will be externally visible through the transparent or translucent shell.

One example implementation represents the addressable units as voxelized data (e.g., voxelized data structure). According to one example implementation, given the fabrication device's three-dimensional space factored by a minimum volume of extrudable material, the fabrication manager defines a resulting volume as a voxel unit (e.g., a volumetric pixel). Each voxel unit generally includes various information corresponding to the object's geometry in that unit's volume. Examples of such information include a three-dimensional mesh model, material information, color information, lighting information and/or texture information (e.g., a texture pattern). The lighting information may include luminosity values, reflection/refraction ratios and/or the like. The fabrication manager may use the lighting information to adjust values in the color information in order to simulate lighting effects. Other information may include implicit surface values (e.g., distance to an object surface mesh). Yet another example of such information includes probabilities indicating whether or not a portion of the object actually occupies the volume represented by the voxel unit.

The fabrication manager may use the texture information to compute a color value for each voxel unit. As the fabrication manager identifies a tool path for printing the three-dimensional object, the fabrication manager also may identify colors that need to be applied to interior locations within the object and/or an outside or exterior shell (e.g., surface mesh) of the object using the texture information. The fabrication manager may provide full color by applying colorized texture patterns to the exterior object shell and/or to each layer (e.g., if color inside the object is desired) via a process where a material is made fluid by heat and/or by chemical reaction and extruded through a nozzle. Alternatively, the fabrication manager computes color values for voxelized data without texture information by using explicit color declarations, gradients, interpolations, and other mathematical procedures.

The following describes example embodiments of a printing tool configured to blend colored material for extrusion during full color object fabrication. An example extruder configuration includes an arrangement of motors and a tool head having a mixing chamber and a nozzle. The tool head also may include a heating element for melting the colored material to a prescribed temperature. The arrangement of motors cooperate to move a combination of colored materials into the mixing chamber and when sufficiently heated and/or blended, through the tool head in order to be deposited on the object. Regarding the tool head, the mixing chamber and/or the nozzle are constructed to automatically blend colored materials without an additional mechanism. To illustrate, one example combination includes colors cyan, yellow, black and green (green is a mixture of cyan and yellow). Hence, the extruder configuration may apply a first volume of cyan material, a second volume of yellow material, a third volume of black material and a fourth volume of green material (after blending appropriate volumes of cyan and yellow materials).

According to one example implementation in which a lighting effect is added to the green material, the fabrication manager measures the object's luminosity corresponding to how light interacts with the object's surface. Using such luminosity values, a controller for the fabrication device instructs the extruder configuration to feed a material with at least some degree of transparency (e.g., a transparent or semi-transparent material) while mixing the cyan and yellow materials. The illuminated green color may realistically represent the object area to which the green color is applied. The extruder configuration may include an additional stepper motor for feeding the transparent or semi-transparent material into the chamber. Another example may be a transparent shell with colors below, thereby providing a realistic sense of depth to the color inside the object when viewed from multiple angles after fabrication. Another example creates translucency effects where light can pass through the object while still providing a color tint. That translucency may become more opaque in thicker parts of the object (e.g. a raw fish fillet).

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and three-dimensional object fabrication in general.

FIG. 1 is a block diagram illustrating an example apparatus for transforming a three-dimensional model into instructions for mixing colored materials according to one example implementation. The following description refers to components that may be implemented in the example apparatus depicted in FIG. 1. Embodiments of these components may be considered hardware, software and/or mechanical in nature.

The example apparatus may be referred to as a fabrication device 102. One example component of the fabrication device 102 includes a control unit or controller 104 coupled to a first mechanism 106 and configured to execute instructions for the first mechanism 106 and a second mechanism 108. A chamber 110 constructed within the second mechanism 108 allows colored materials to be prepared (e.g., heated) and/or blended when fabricating an object 112. For example, the chamber 110 enables melting, mixing, and extruding of colored filaments or a combination of compatible materials.

These instructions mentioned above, which are stored in an instruction set 114, may be collectively referred to as coordinated instructions because such instructions are executed, for the most part, harmoniously. A fabrication manager 116 may coordinate these instructions in a number of implementations; for example, instructions for different stepper motors in an extruder configuration may be coordinated such that an appropriate colored material is feed into the chamber 110, enabling seamless color changes. Therefore, an instruction for one stepper motor may be synchronized in time with an instruction for another stepper motor such that both stepper motors can operate in parallel, in sequence or in any order that reduces waste, quickens fabrication time and/or improves quality. These instructions may be further coordinated with instructions for moving the first mechanism 106 as described herein.

The fabrication manager 116 may include hardware/software components operating on various embodiments of computing devices, such as a remote computing device and/or an attached computing device. One example implementation of the fabrication manager 116 processes captured volumetric sensor data, corresponding to an object being fabricated, in a three-dimensional model and partitions that information into layers in which each layer comprises at least some geometry, which may include geometric elements corresponding to a surface mesh. The present disclosure may use "partition", "slice", or another similar term in place of "layer" and it is appreciated that these terms be defined as interchangeable.

Within partition information 118, the fabrication manager 116 stores color values corresponding to a geometry of the three-dimensional model. Geometry generally refers to a set of geometric elements, such as a three-dimensional polygon or shape, which may represent an amount of colored material is to be deposited. One example measure represents at least a portion of the geometry—and therefore, the amount of colored material—volumetrically. The example measure may define a portion of the geometry using standardized units in which each unit represents a minimal amount (e.g. volume) of colored material at a given time instance, such as by an extrusion width. Each geographic element may include one or more standardized unit.

To illustrate one example, a verified manifold object, represented in a three-dimensional mesh model, may be partitioned into layers by processing each triangle representing the object, and projecting each triangle through a slicing plane. This projection generates a point and connections to other points in a manner that eventually creates a path. From this point, the path is reduced to units (e.g., volumetric measures of geometric elements) representing the smallest addressable unit for a specific hardware characteristic of a corresponding fabrication device. These unit are not necessarily a same size, axis aligned and/or a same size in each dimension. One example implementation may utilize non-cubic units of different sizes along an x, y or z axis, which enables different effective resolutions per dimension.

According to one example implementation, the partition information 118 may include voxelized data such that each addressable (voxel) unit comprises various information, such as a color value, texture value, and/or lighting value, for geometry within that addressable unit.

The first mechanism 106 may be referred to as a robotic mechanism (e.g., a gantry robot) comprising various mechanical or electro-mechanical components. By executing at least some instructions within the instruction set 114, the first mechanism 106 may actuate these components into performing at least some physical movement. When actuated, these components may move horizontally, vertically, diagonally, rotationally and so forth. One example implementation of the first mechanism 106 moves a printing mechanism or tool across an x, y or z-axis in order to deposit material at a specific position within the object 112 being fabricated.

The second mechanism 108 may be referred to as a printing mechanism that includes one or more printing tool heads. The material may be pushed or pulled into a printing tool head in which case the motors may not be collocated with the printing tool head but may be mounted further away in order to push the material through a thin guide tube into the chamber 110. Although the second mechanism 108 may resemble an extruder configuration (e.g., a single extruder head configuration), it is appreciated that the second mechanism 108 represents any compatible technology, including legacy printing tool heads. Furthermore, the second mechanism 108 may include printing tool heads configured to deposit other materials in addition to colored materials and/or transparent materials. As such, the second mechanism 108 may include a second chamber and a second nozzle that provides another material (e.g., a polymer) when printing certain structures during fabrication, such as support structures, purge structures and/or the like. Purge structures may refer to areas of the object's model where unusable colored material is deposited. As one example, leftover transitional material in the chamber 110 may be deposited in the purge structure. These structures may be added to the object's model by the fabrication manager 116.

The fabrication manager 116 is configured to generate instructions that, when executed by the controller 104, actuate components of the first mechanism 106, which may result in movement(s) of the second mechanism 108 following a surface geometry (e.g., an exterior shell) of the object 112. The fabrication manager 116 also generates other instructions that, when executed by the controller 104, cause the second mechanism 108 to mix colored materials in the chamber 110, for example, by controlling stepper motor activity in order to feed colored materials into the chamber 110 and extrude blended colored materials through a nozzle 120. The fabrication manager 116 may configure both groups of instructions to be executed in coordination with each other, thereby enabling smooth color gradients in the object 112 and/or effective blending in the chamber 110 and/or the nozzle 120.

Optionally, a movable platform, such as a platform 122, functions as a mechanism for printing the object 112. The first mechanism 106 may operate the platform 122 to guide the object 112 and the nozzle 120 to each other. The instruction set 114 may include instructions for automatically calibrating the platform 122 such that through a series of movements in an x, y and/or z direction or in rotation across an x-y plane, the three-dimensional object 112 is moved to a correct position for the nozzle 120 to deposit material.

Some example embodiments of the fabrication device 102 include legacy devices that are retrofitted with at least some of the components described herein, including the controller 104, the fabrication manager 116, and/or a printing tool head, such as the second mechanism 108. As one option, the fabrication device 102 may include an additional microprocessor to manage the set of motors and to receive a signal from an original microprocessor when a command (e.g., a GCode Color Change command) is processed. In one example implementation, a legacy microcontroller continues to pass motor speed values to the controller 104 as if the legacy microcontroller were directly managing a motor. The controller applies a color ratio based on these values as the printing tool head extrudes and otherwise mimics a standard print head. The legacy microcontroller may be modified to support an extra signal for color changes.

Figure 2:
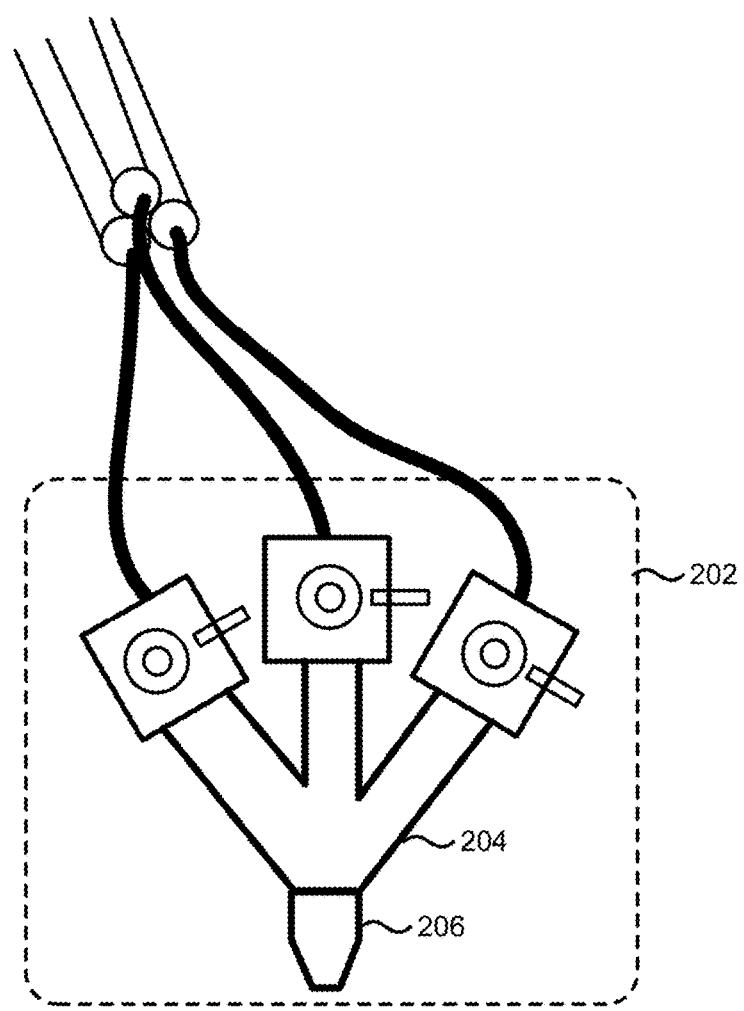
FIG. 2 is a representation illustrating at least some components of a fabrication device according to one or more embodiments described herein.

FIG. 2 is a representation illustrating at least some components of a fabrication device according to embodiments described herein. The fabrication device includes an extruder configuration 202 into which colored materials (e.g., three colored materials) are fed from a source.

According to one example embodiment, the extruder configuration 202 includes stepper motors for at least three (3) colored materials (e.g., filaments). This configuration may be extended to four (4), five (5), or six (6) stepper motors for four (4), five (5), or six (6) color materials of various opacities, including an optional translucent material, respectively, and so forth. The extruder configuration 202 also includes a printing tool head comprising a chamber 204, which may be known as a mixing chamber or a melting chamber, and a nozzle 206. The printing tool head for the extrusion configuration 202 may include a heating element and a thermostat in order to control melting and blending of colored materials within the chamber 204.

One example embodiment of the extruder configuration 202 operates by blending separate molten colored plastic filament material in a narrow melting chamber and extruding the mixture through a smaller bore within the printing tool head. The rate that the stepper motors move a colored material into the chamber 204 is based on a color value. The color value, possibly in combination with other properties (e.g., colored filament size, motor gear size, motor degree (amount it turns with each step or pulse) and/or the like), may determine a speed of each stepper motor controlling the movement of each colored filament into the chamber 204. As material in the chamber 204 is pushed into the smaller diameter nozzle (e.g., a rifled nozzle), the colored filament is further mixed into the desired color through resistance in the channel until it is finally deposited outside the nozzle 206 onto the object being printed.

Figure 3A:
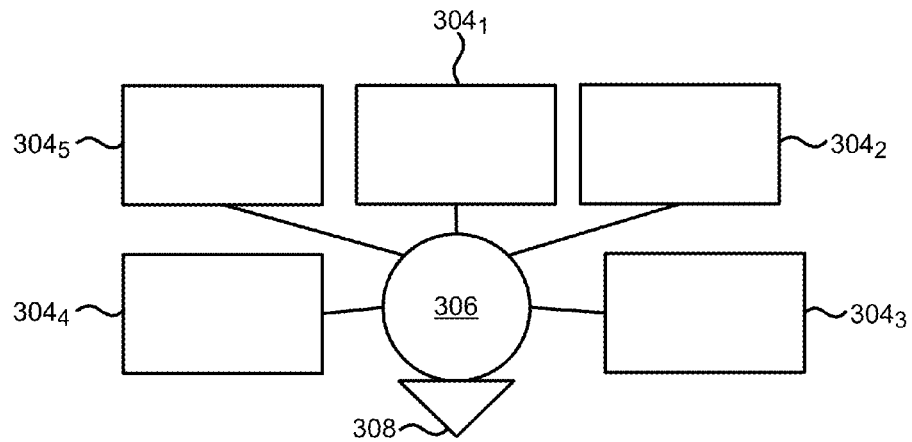
FIG. 3A and FIG. 3B are block diagrams illustrating example extruder configurations according to one or more alternative implementations.
Figure 3B:
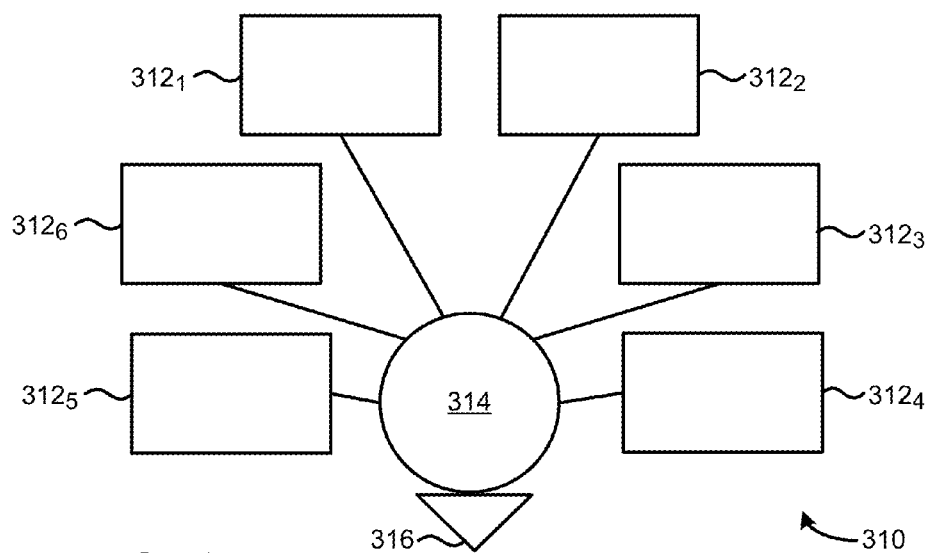

FIG. 3A and FIG. 3B are block diagrams illustrating example extruder configurations according to alternative implementations. FIG. 3A and FIG. 3B illustrate different angles at which the motors may be configured without dragging or touching other parts of the example apparatus, for example.

FIG. 3A illustrates an extruder configuration 302 comprising a set of motors 304, a chamber 306 and a head 308. The set of motors 304 may include an arrangement of five (5) stepper motors. In one example implementation involving five colored filaments (e.g., cyan, yellow, magenta, white and black), each colored filament corresponds to one of the stepper motors. One alternative implementation employs four different colored filaments (e.g., cyan, yellow, magenta and white) in which each colored filament is fed by four (4) motors and an aperture where the fifth motor is otherwise positioned. Optionally, the aperture can be configured with three (3) removable 'plugs' or the like that close access to colors not in use while sealing the chamber 306.

FIG. 3B illustrates an extruder configuration 310 comprising a set of motors 312, a chamber 314 and a head 316. The set of motors 312 ($312_1$-$312_6$) is an arrangement of six (6) stepper motors. According to one example implementation, a transparent or semi-transparent material may be feed by one of the motors 312, such as the motor $312_4$, in addition to the cyan, yellow, magenta, white and black colored filaments. Mixing the transparent or semi-transparent material with the colored filaments may result in realistic looking three-dimensional objects. Rates at which the motor $312_4$ feeds the transparent or semi-transparent material into the chamber 314 may correspond to luminosity values corresponding to light, which may be measured by a fabrication manager (e.g., the fabrication manager 116) as described herein.

Based on various properties, including filament size and stepper motor capability, some example embodiments provide fine-grained color resolution by arranging stepper motors at an acute step-angle (e.g., 1.8 degrees per step). This resolution can be improved by augmenting gears or the like to the stepper motor shafts or changing the size of the filament. This provides a near infinite range of color resolution through extremely fine control of the filament. One example embodiment includes using a single motor that feeds white filament, along with liquid colorant cartridges. An ink jet may discharge the colorant fluids in the appropriate ratios into the chamber through smaller bore holes than those used for filament.

Figure 4:
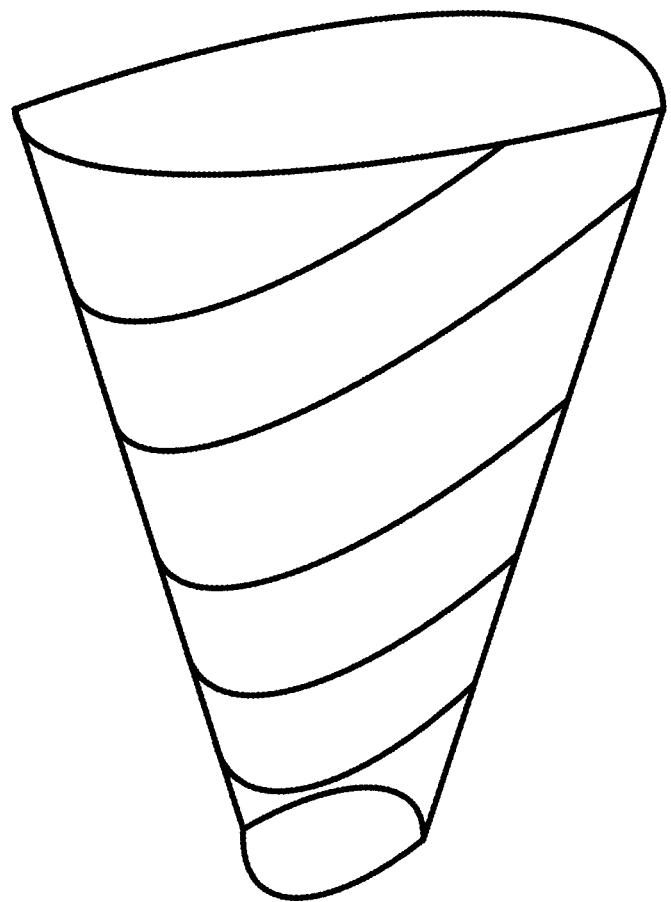
FIG. 4 is a representation illustrating an example nozzle for an example extruder configuration according to one or more example implementations.

FIG. 4 is a representation illustrating a component of an example printing tool head for an example extruder configuration according to one example implementation. FIG. 4 depicts a nozzle 402 (e.g., a nozzle with rifling) that is configured to be small enough to encourage automatic mixing through friction and material flow. This design optionally may be enhanced by providing a taper, spiral or other pattern on the inside to further encourage filament circulation prior to exiting the nozzle. Filament is most often provided on spools or small reels. Material may be pulled or pushed into the extruder. The size of the motor depends upon a force required to move the filament into the chamber. To reduce friction when moving colored filament(s) and to keep the multiple strands of filament from tangling, the extruders may be connected to the assembly by plastic tubes.

The nozzle 402 is guided by a robotic mechanism (e.g., the first mechanism 106 of FIG. 1) capable of moving an extruder head and/or a print platform in any X, Y and/or Z direction. One example component sends each Z-layer over a communication link (e.g., a serial or USB connection) to a microcontroller of the robotic mechanism. The robotic mechanism processes all the tool-path and color instructions for the current Z layer and then, changes to the next level. Each level cures, or dries such that the next layer is extruded and fused onto the previous layer. The result is a full color three-dimensional object based on a three-dimension model and printed out of the extruded material.

Figure 5:
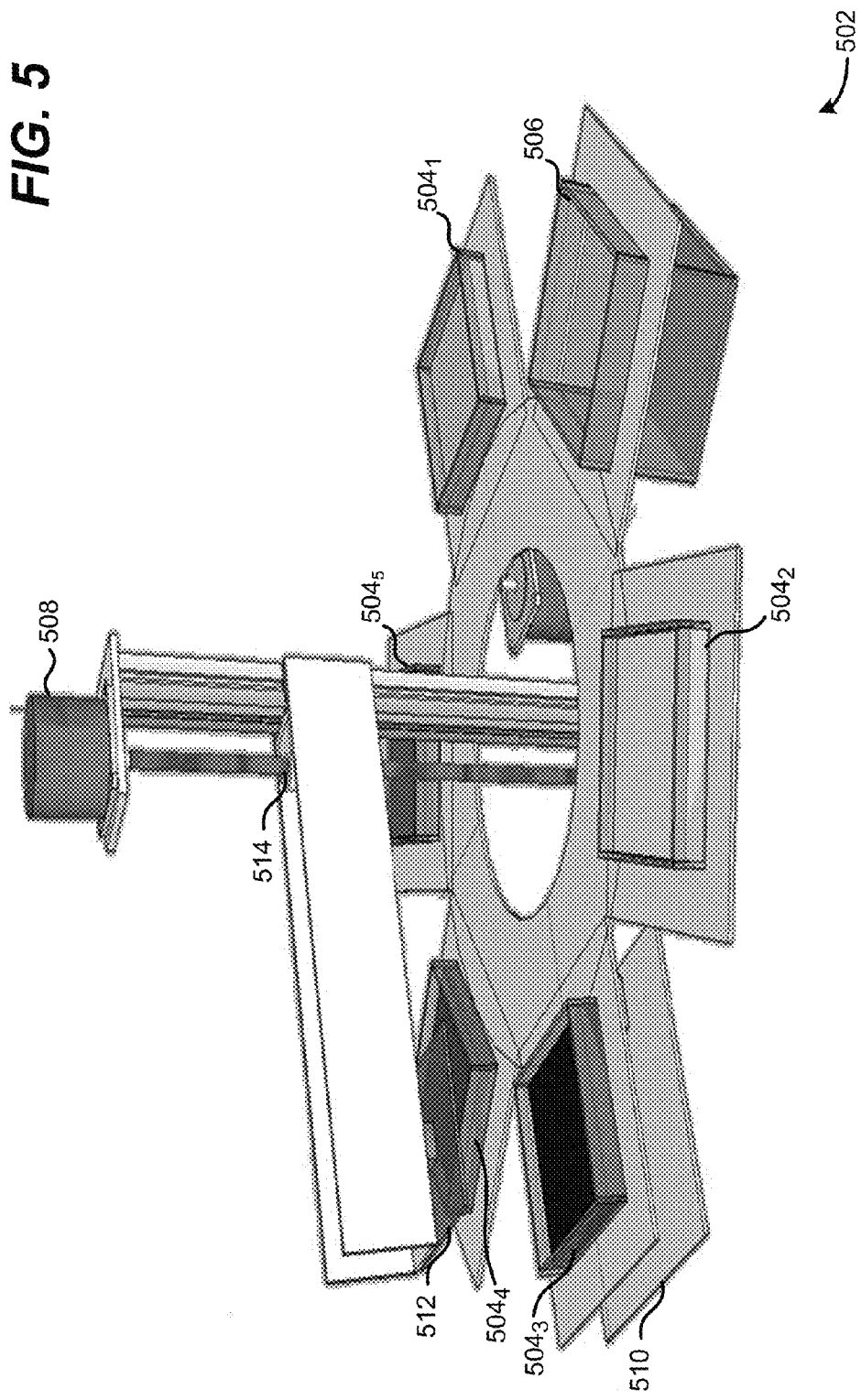
FIG. 5 is a representation illustrating an example motor driven carousel according to one or more example implementations.

FIG. 5 is a representation illustrating at least some components of a fabrication device according to embodiments described herein. One example component of the fabrication device includes an example motor-driven carousel 502 configured to support a plurality of vats, including a set of vats 504 and a cleaning vat 506. The set of vats 504 may be shallow vats comprising ultraviolet curing resins, such as colored resins or resins of different properties. The cleaning vat 506 may be used for cleaning uncured resin from a fabricated object before switching colors or properties. The example fabrication device may perform a method for generating a multi-colored three-dimensional object that involves removing uncured resin, for example, by using a spray or a dip with agitation.

Each vat of the set of vats 504 may hold a resin having a color and a set of properties. To illustrate, the example fabrication device may include vats holding different colored resins. In addition, a vat may include a "clear" resin that enables creation of diffuse colors, transparent surfaces with deep color inside the object, translucency effects and/or the like. Vats of an alternative fabrication device includes resins of different properties: flexible, hard, clear, dissolvable, and so forth. A robotic gantry operated by a control unit 508 may be configured to move the object toward the interior or exterior of the set of vats 504 to avoid cross-vat contamination. Also, the set of vats 504 may be rotated instead of the object being fabricating. The motor-driven carousel 502 may include an Ultraviolet (UV) projection device 510 beneath a build platform 512 such that a desired vat may be positioned above the UV projection device when curing resin. The UV projection device 510 may include a UV Laser diode and mirrors with position control, a Digital Light Processing (DLP) microprocessor with a UV lamp and a light guide. It is appreciated that there other devices capable of focusing a precise amount of UV light on the vat bottom and the present disclosure applies to these devices as well as the UV projection device 510 described herein.

One example implementation of the motor-driven carousel 502 rotates the desired vat of the set of vats 504 until positioned directly under the object currently undergoing fabrication and above the UV projection device 510. The robotic gantry lowers the build platform 512 with the object into the desired vat. By having a clear bottom, the desired vat allows the halftone of resin to be fused to the object at the interference between the object and the desired vat bottom. A depth each color may be determined by the halftone pattern. For example, if attempting to build a pure purple layer comprised of 50% red and 50% blue, the object may be lowered into a blue resin vat such that a previous layer is one (1) layer thickness away from the bottom of the vat. At this point, the resin may be cured with a 50% blue stippling pattern. The object may be moved to the cleaning vat 506 where if space remains on the layer, the object may be lowered completely to the bottom of a red resin vat to have the remaining 50% of a red stippling pattern cured. Hence, the halftone pattern may define amounts for each color in terms of percentages used in fabricating the layer.

A number of hardware/software components may enhance and/or facilitate the generation of multi-colored three-dimensional objects. These components may be housed within the control unit 508 and may include a fabrication manager (e.g., the fabrication manager 116 of FIG. 1) that generates instructions for moving the motor-driven carousel 502 to an appropriate vat for depositing resin or removing resin and moving the object being fabricated into that vat. These instructions may be coordinated to effectuate full color at fine-grained color resolution. Another component, which may be known as a controller, executes these instructions causing actuation of one or more robotic mechanisms, motors and/or printing tools.

In order to generate such instructions, the fabrication manager may be configured to decompose a layer into color information and convert that color information to a halftone pattern appropriate for resin curing properties. The fabrication manager may be configured to communicate the halftone pattern to the controller or firmware controlling the curing method and vat selection. By managing UV duration and/or intensity order, the example fabrication device creates a stippling pattern to represent shades of color.

An addressable voxel unit represents a color and a specific vat according to one example implementation. To print the layer, the vat of a desired color is moved into location under a collection tool head 514, and the collection tool head 514 lowers to the bottom of the selected vat, minus the maximum printable height. Voxel units for the specific color are illuminated by UV light for a certain duration until solid. Then, the controller instructs the collection tool head 514 to retract from the selected vat and return to a rest position to prepare for a color change.

One example voxel unit represents a source triangle having color and physical characteristics associated with a material. These characteristics, including any related information, are propagated into a path on the example voxel unit's plane, and interpolated into various voxelized data, including color values. Performing such interpolation depends upon various factors, such as a number of vats and/or contents and properties of the vats. One example component of the control unit 508 may approximate values of the voxel units by stippling the path in accordance with a halftone algorithm and then, determining an approximate color value given the source triangle values and the available resin.

Excess uncured resin may accumulate on a partially-generated object, which may interfere with an application of a next color. To remove such uncured resin, the control unit 508 causes the motor-driven carousel 502 to move the cleaning vat 506 into an appropriate position. The control unit 508 instructs the collection tool head 514 lowers the partially-generated object into the cleaning vat 506, washing away the uncured resin. Example washing mechanisms include a pressure wash or a dip into an appropriate solvent with agitation. The example collection tool head 514 extracts the object, and moves into a position over the vat with the next color for the layer. The collection tool head 514 lowers until positioned over an outer layer and illuminates voxels for the next color until all colors have been illuminated. When the layer is printed completely, the control unit 508 initiates the application of a next layer unless the object is fully fabricated.

Figure 6:
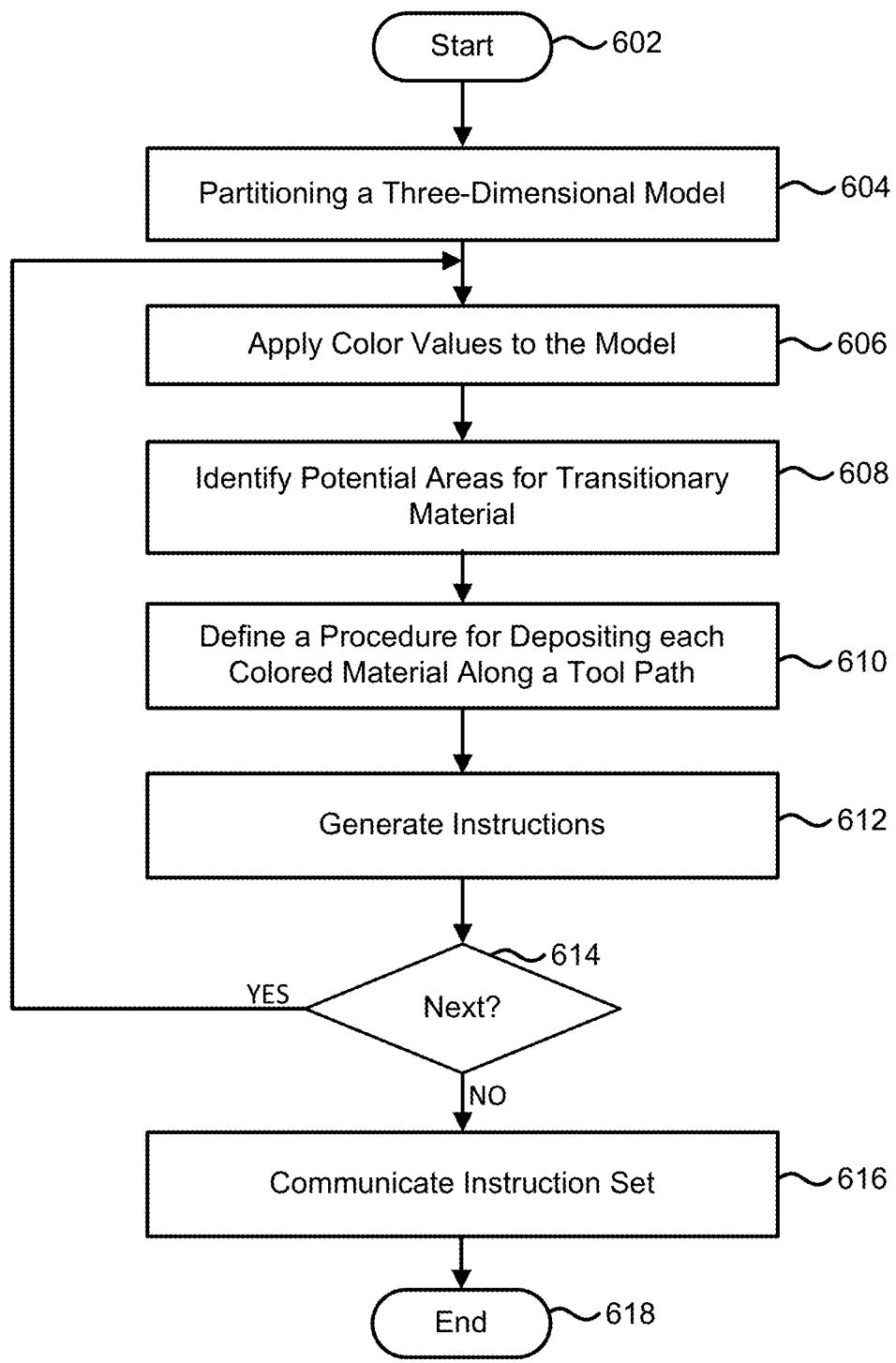
FIG. 6 is a flow diagram illustrating example steps for generating a coordinated instruction set for a fabrication device according to one example implementation.

FIG. 6 is a flow diagram illustrating example steps for generating a coordinated instruction set for a fabrication device according to one example implementation. One or more hardware/software components (e.g., the fabrication manager 116 of FIG. 1) may be configured to perform the example steps. Step 602 commences the example steps and proceeds to step 604 where a three-dimensional model is partitioned into layers. Each layer may be represented as a set of addressable units in which each unit comprises at least a portion of a geometric element. Geometric elements generally refer to polygons projected onto a plane as paths having at least some volume. These paths may form an exterior shell representing an object being fabricated. These exterior shell may be enhanced into a solid representation, which may or may not have a colored interior geometry with a transparent exterior. According to one implementation, each unit may be defined as a minimal amount/volume of colored material capable of being applied during fabrication. Hence, the path, or a portion thereof, in an example unit may have a volume equal to or less than the above minimal amount/volume of colored material. Other implementations may define each unit in other ways, for example, as a voxel comprising one or more geometric elements.

As an example, the three-dimensional model may be partitioned along a Z-axis into Z layers. Each Z layer represents units in an X-Y plane that are to be filled with at least one colored material. Each layer may include a three-dimensional voxelized data structure based on the units comprised therein. The height of the Z layer is dependent on the resolution or quality of the fabrication device.

Step 606 is directed towards computing color values for the units. One example implementation applies texture information to the units by mapping a texture pattern to the layer such that each unit's address is mapped to a coordinate in that texture pattern and translating each mapping into an appropriate color, interpolating as necessary. Other example implementations utilize non-texture information to compute the color values (e.g. mathematical formulas deriving color value from position within the object).

Step 608 identifies potential areas of the layer for depositing transitional materials. On occasion, for example, leftover material may need to be purged before a next material of a different color physical characteristic can be prepared and deposited. These materials may be herein referred to transitional materials. One example implementation may be configured to deposit transitional materials that may or may not be colored. These areas may be defined as one or more units where color provides little or no value (e.g., aesthetic value). For example, models utilize exterior support structures to hold up overhanging parts of the object being fabricated. Support structures are intended to be broken or cut off at the end of the fabrication. This is one example area to deposit transitional material when a color change is expected.

To handle instances when a sudden color change is expected and leftover transitional material remains in the fabrication device but a convenient infill area for depositing such material is not available, one example implementation adds an extraneous structure the three-dimensional model outside the dimensions of the object's geometry enabling the fabrication device to purge the head until material for a next color is available. Otherwise, the fabrication device may be configured to deposit the leftover transition material on an infill area, such as an interior geometry/position within the three-dimensional model that is not visible when the object is completely fabricated.

Step 610 defines a procedure for depositing a combination of colored materials by moving a printing tool according to a tool path and controlling rates for applying each colored material along that path. One example implementation determines for each unit a stepper motor speed at which one or more colored materials are fed into the printing tool while that tool, following the tool path, moves the printing tool head to that unit's address/location on the object being fabricated. Step 612 generates instructions for the fabrication device comprising coordinated instructions for the depositing procedure and the tool path.

One example implementation generates example coordinated instructions (e.g., op codes, g-code and/or the like) to drive a robotic mechanism (e.g., the first mechanism 106 of FIG. 1) and deposit colored materials using the printing tool (e.g., the second mechanism 108 of FIG. 1). The printing tool includes a head with a nozzle and a set of motors, which can be local or remote. A controller configures a tool-set or coordinated instruction set for each Z layer that, when executed, causes the robotic mechanism to move the printing tool head to an area where the printing mechanism deposits a combination of colored materials. Such a combination generally refers to a series of colored materials of which some may be blended to produce different colors and some colored materials may be individually applied. To illustrate, one example combination includes colors cyan, yellow, black and green. Hence, the printing mechanism may apply a first volume of cyan material, a second volume of yellow material, a third volume of black material and a fourth volume of green material after blending volumes of cyan and yellow materials at an appropriate ratio.

Because at least some colored material remains in the printing mechanism, color changes may involve feeding a new colored material while applying a current colored material. The new colored material may be feed at a specific rate (e.g., a positive or negative rate), which is adjusted as more new colored material is moved by the printing mechanism. For example, if the current color is yellow and the printing mechanism is instructed to deposit green as the new color, the coordinated instructions cause the printing mechanism to slightly retract the yellow material and push in a slightly larger amount of the cyan material to blend with the existing yellow material.

After allowing the deposited material to cool or dry, step 614 determines whether to fabricate a next layer of the three-dimensional model. If there are no more layers in the model, step 614 proceeds to step 616. If step 614 decides to decompose the next layer, step 614 returns to step 606. Step 616 communicates a coordination instruction set to the fabrication device. Step 618 terminates the example steps depicted in FIG. 6.

Figure 7:
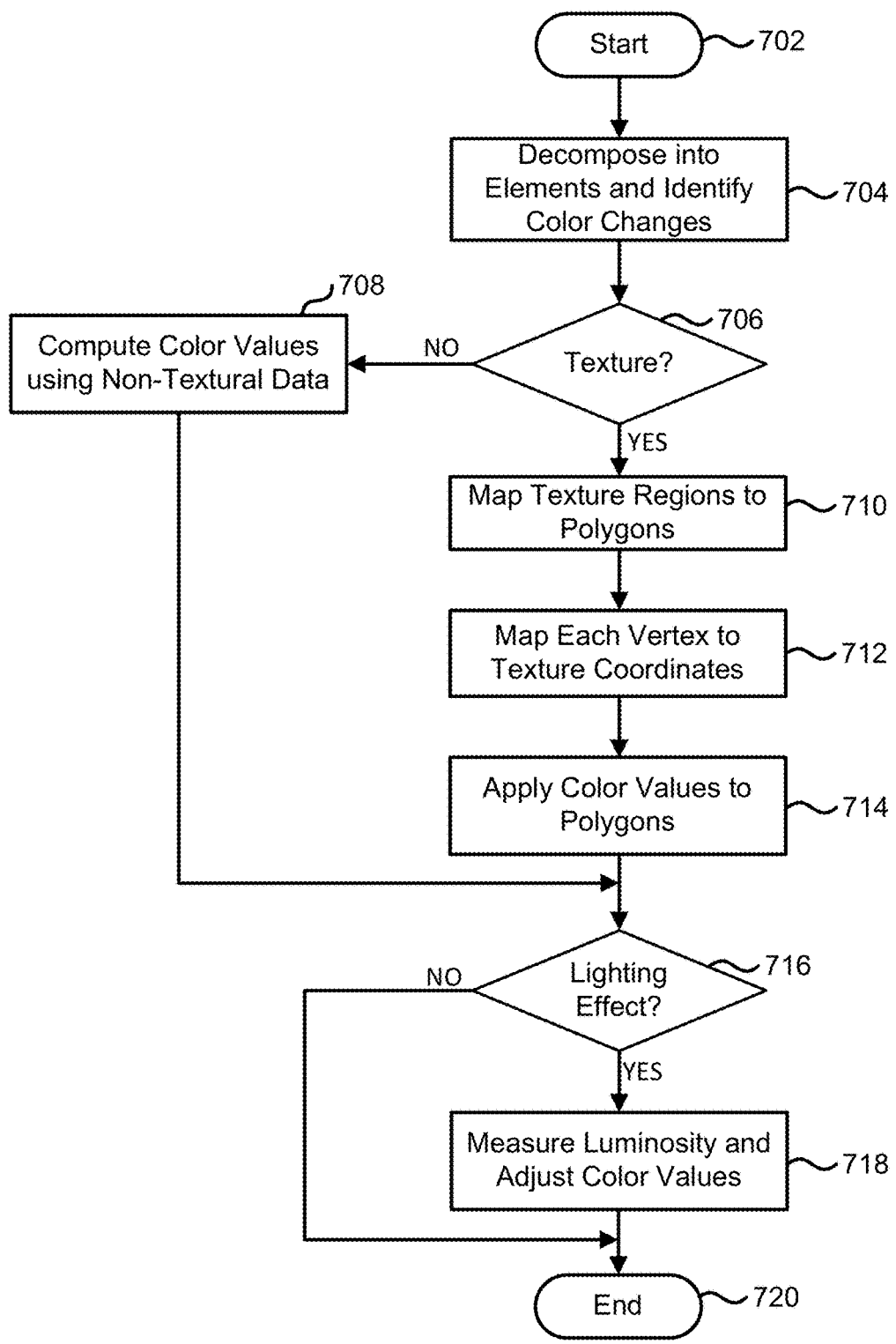
FIG. 7 is a flow diagram illustrating example steps for computing color values according to one or more example implementations.

FIG. 7 is a flow diagram illustrating example steps for computing color values according to one example implementation. One or more hardware/software components (e.g., the fabrication manager 116 of FIG. 1) may be configured to perform the example steps. Step 702 commences the example steps and proceeds to step 704 where a layer is decomposed into elements, including geometric elements, and color changes are identified. As described herein, these elements are projected onto the layer's three-dimensional plane, which is further decomposed into addressable units forming a shell corresponding to an object's geometry. These color changes may occur between units within the layer and/or between adjacent layers.

Step 706 determines whether texture information is available. The texture information describes the pattern or specific color bitmap to apply on a 3D surface mesh model in one or more external files. The three-dimensional surface mesh may be exported with the texture information as part of a native file format. The same texture information may be used for multiple polygonal faces. Different regions in a texture might be mapped to different polygons.

Step 706 proceeds to step 708 if the texture information is not available. Step 708 computes color values for the geometric elements using non-textural data. For example, the fabrication manager may generate color using related mathematical functions, such as linear or radial gradients, rainbow patterns, and/or other mathematically defined procedures. Step 706 proceeds to step 710 if the texture information is available.

Step 710 is directed towards mapping texture regions to polygons. One texture mapping mechanism employs a mesh model that has been pre-sliced into polygonal geometries and maps the texture region to the entirety of the polygonal geometry on that layer. Step 712 maps each vertex to texture coordinates in the texture regions. Step 712 also scales the texture coordinates in both dimensions to map directly to the vertices of the polygonal face. Step 714 applies color values to the polygons and proceeds to step 716. The fabrication manager may be instructed to apply texture information to the three-dimensional model to produce color values. As the fabrication manager identifies a tool path for printing a shell of the three-dimensional object, the fabrication manager also identifies colors that need to be applied to the outside shell (surface mesh) of the object using the texture information associated with the model.

Step 716 determines whether to add a lighting effect. If so, step 716 proceeds step 718, which measures luminosity and adjusts the color values. The three-dimensional model may include lighting information providing a variety of effects, such as simulating an object having bright colors as if the object was fully sunlit, muting or shading colors as if the object is in a darkened location. Another lighting effect includes dappling where an object may appear to in vegetal shade. The lighting information may have an intrinsic color such that modifies a non-illuminated color value of the model. The adjustment to the color value may simulates lights of various colors shining on the texture of the object making the object appear as if light were pointing at the model. Step 720 terminates the example steps depicted in FIG. 7.

Figure 8:
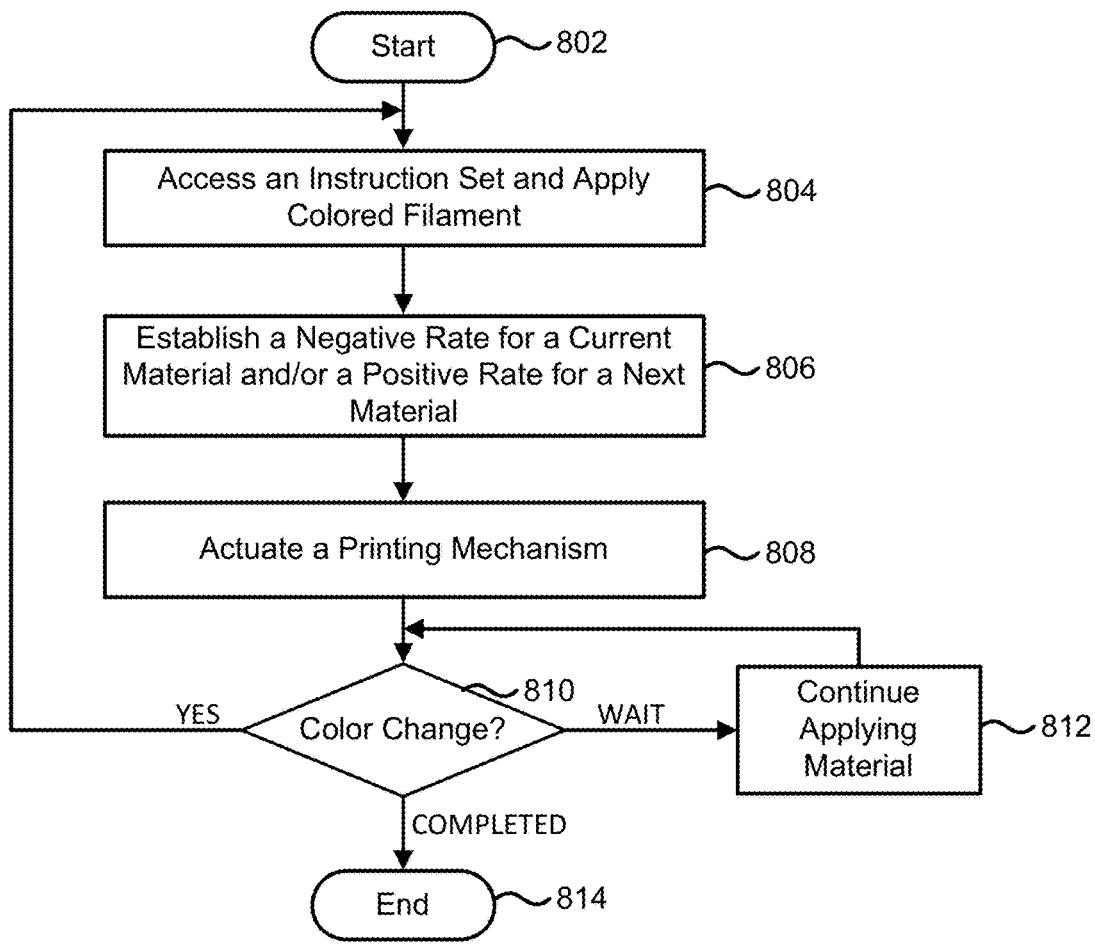
FIG. 8 is a flow diagram illustrating example steps for executing instructions for a fabrication device according to one or more example implementations.

FIG. 8 is a flow diagram illustrating example steps for executing instructions for a fabrication device according to one example implementation. One or more hardware/software components (e.g., the controller 104 of FIG. 1) of a robotic mechanism (e.g., the first mechanism 106 of FIG. 1) may be configured to perform the example steps, for example, by executing instructions provided by other hardware/software components (e.g., the fabrication manager 116 of FIG. 1). Step 802 commences the example steps and proceeds to step 804 where an instruction set comprising coordinated instructions is accessed and executed commencing a three-dimensional object fabrication process and causing colored filament to be applied during such fabrication.

Step 806 establishes a negative rate for a current material and/or establishes a positive rate for a next material. The coordinated instructions prescribe that these rates be achieved in substantial synchronicity. Step 808 actuates a printing mechanism in accordance with the coordinated instructions. The coordinated instructions define tool paths configured to change color in advance of where a next colored filament is needed by eliminating a previous color, for example, by clearing an extruder configuration's mixing chamber of the previous color. Consider an example where yellow filament is being deposited and green filament is the next color, the coordinated instructions causes the extruder configuration to begin feeding the cyan material such that the correct mixture of colored material reaches the extruder configuration's nozzle when the green filament is expected. Additionally, the extruder configuration may change the colored filament and start the infill procedure on the next layer. When a sufficient amount of colored material has passed through the extruder configuration's mixing chamber to provide the desired green color for an outside shell, any leftover material may be purged into an area off the model or another non-critical area. This allows for sudden dramatic color changes on an exterior of the three-dimensional object while maintaining transitional colored material in an inside shell. Alternatively, the transitional colored material may be utilized for structural support.

Because of the material already in the chamber that has not yet been deposited, color changes may be executed using knowledge of the current color in the tube and based on previously calculated tool paths, allow for 'smart mixing' where an extruder motor associated with each base color of filament starts feeding filament at a specific rate (e.g., a positive or negative rate) and adjusts as new colored material is pushed into the chamber. For example, if the current color is yellow and the print needs green, instructions are sent to slightly retract the yellow filament and push in a slightly larger amount of cyan to mix with the existing yellow in the chamber. This process may be applied gradually, adjusting the feed rates of both colors over time till reaching the desired mix in the chamber. Then, the system follows with the usual values/ratios for making the appropriate green color.

Step 810 monitors the printing mechanism for the pending color change and determines a moment when a new color is needed. When that moment occurs, step 810 returns to step 804 where a next instruction is accessed and executed. If that moment has not been reached, step 810 proceeds to step 812 and waits. Step 812 continues applying the current color's filament for a period of time (e.g., a few seconds). If step 810 determines that the printing mechanism has completed the fabrication process, step 814 terminates the example steps of FIG. 8.

Example Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 9:
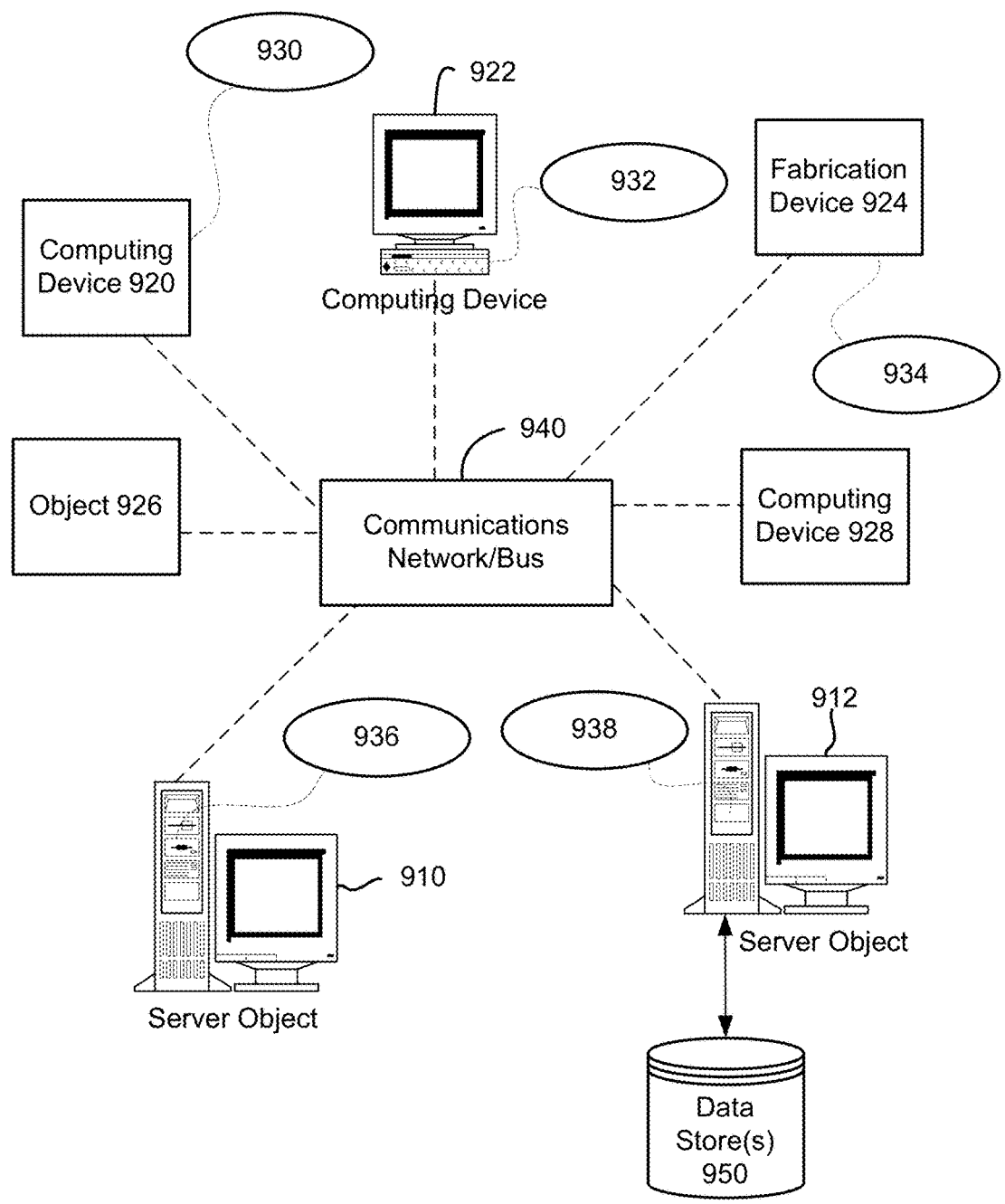
FIG. 9 is a block diagram representing example non-limiting networked environments in which various embodiments described herein can be implemented.

FIG. 9 provides a schematic diagram of an example networked or distributed computing environment. The distributed computing environment comprises computing objects 910, 912, etc., and computing objects or devices 920, 922, 924, 926, 928, etc., which may include programs, methods, data stores, programmable logic, etc. as represented by example applications 930, 932, 934, 936, 938. It can be appreciated that computing objects 910, 912, etc. and computing objects or devices 920, 922, 924, 926, 928, etc. may comprise different devices, such as personal digital assistants (PDAs), audio/video devices, mobile phones, MP3 players, personal computers, laptops, etc. At least one of the computing objects or devices 920, 922, 924, 926, 928, etc. comprises a fabrication device, as described herein, which is illustrated in FIG. 9 as a fabrication device 924.

Each computing object 910, 912, etc. and computing objects or devices 920, 922, 924, 926, 928, etc. can communicate with one or more other computing objects 910, 912, etc. and computing objects or devices 920, 922, 924, 926, 928, etc. by way of the communications network 940, either directly or indirectly. Even though illustrated as a single element in FIG. 9, communications network 940 may comprise other computing objects and computing devices that provide services to the system of FIG. 9, and/or may represent multiple interconnected networks, which are not shown. Each computing object 910, 912, etc. or computing object or device 920, 922, 924, 926, 928, etc. can also contain an application, such as applications 930, 932, 934, 936, 938, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 9, as a non-limiting example, computing objects or devices 920, 922, 924, 926, 928, etc. can be thought of as clients and computing objects 910, 912, etc. can be thought of as servers where computing objects 910, 912, etc., acting as servers provide data services, such as receiving data from client computing objects or devices 920, 922, 924, 926, 928, etc., storing of data, processing of data, transmitting data to client computing objects or devices 920, 922, 924, 926, 928, etc., although any computer can be considered a client, a server, or both, depending on the circumstances. Computing object 912, for example, acting as a server provides client computing objects or devices 920, 922, 924, 926, 928, etc. with access to storage resources within data store(s) 950.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 940 or bus is the Internet, for example, the computing objects 910, 912, etc. can be Web servers with which other computing objects or devices 920, 922, 924, 926, 928, etc. communicate via any of a number of known protocols, such as the hypertext transfer protocol (HTTP). Computing objects 910, 912, etc. acting as servers may also serve as clients, e.g., computing objects or devices 920, 922, 924, 926, 928, etc., as may be characteristic of a distributed computing environment.

Example Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 8 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 10:
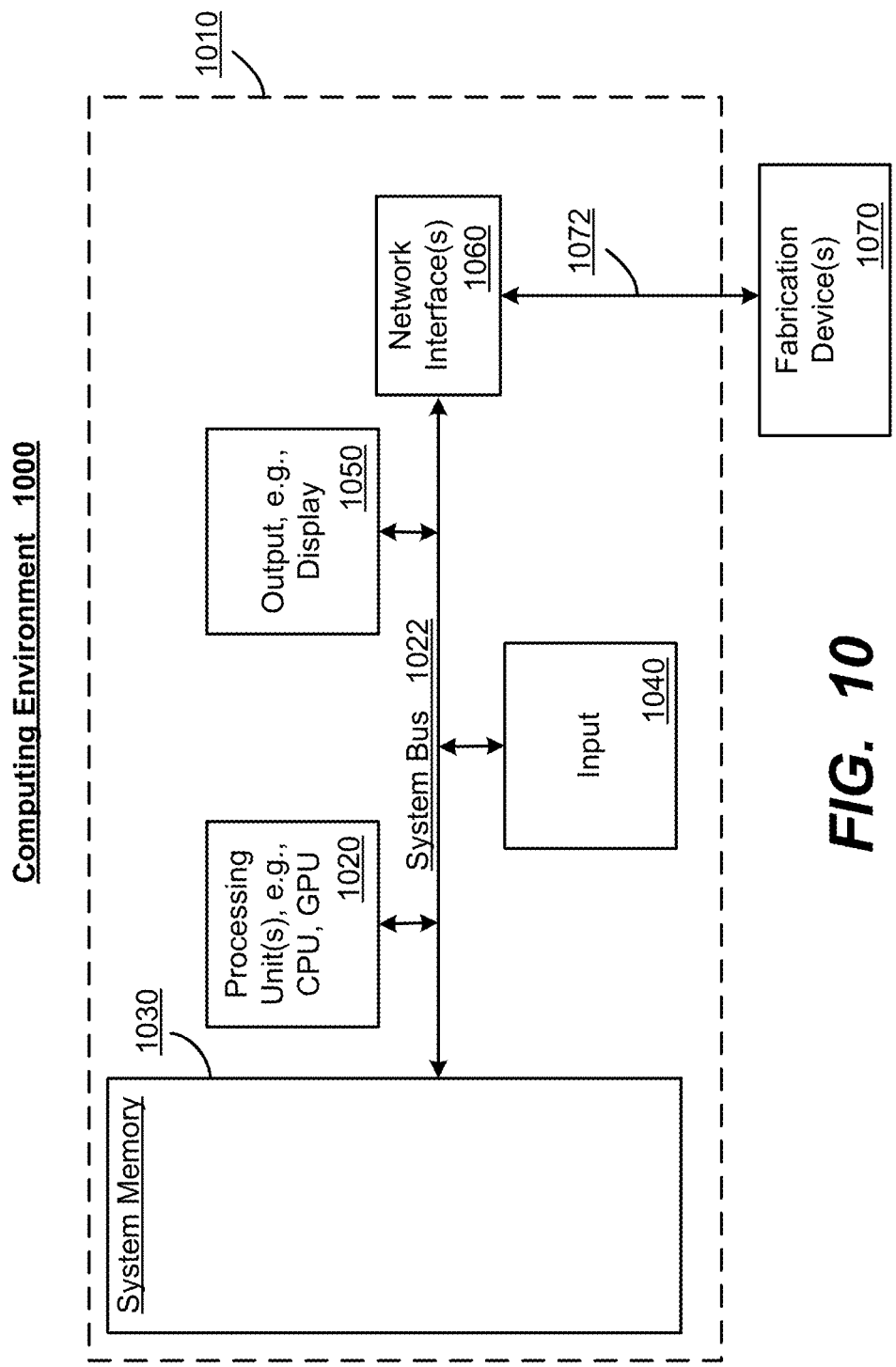
FIG. 10 is a block diagram representing an example non-limiting computing system or operating environment in which one or more aspects of various embodiments described herein can be implemented.

FIG. 10 thus illustrates an example of a suitable computing system environment 1000 in which one or aspects of the embodiments described herein can be implemented, although as made clear above, the computing system environment 1000 is only one example of a suitable computing environment and is not intended to suggest any limitation as to scope of use or functionality. In addition, the computing system environment 1000 is not intended to be interpreted as having any dependency relating to any one or combination of components illustrated in the example computing system environment 1000.

With reference to FIG. 10, an example remote device for implementing one or more embodiments includes a general purpose computing device in the form of a computer 1010. Components of computer 1010 may include, but are not limited to, a processing unit 1020, a system memory 1030, and a system bus 1022 that couples various system components including the system memory to the processing unit 1020.

Computer 1010 typically includes a variety of computer readable media and can be any available media that can be accessed by computer 1010. The system memory 1030 may include computer storage media in the form of volatile and/or nonvolatile memory such as read only memory (ROM) and/or random access memory (RAM). By way of example, and not limitation, system memory 1030 may also include an operating system, application programs, other program modules, and program data. Optionally, the computer 1010 includes various logic, for example, a circuit designed to perform operations defined in terms of elementary functions of mathematical logic.

A user can enter commands and information into the computer 1010 through input devices 1040. A monitor or other type of display device is also connected to the system bus 1022 via an interface, such as output interface 1050. In addition to a monitor, computers can also include other peripheral output devices such as speakers and a printer, which may be connected through output interface 1050.

The computer 1010 may operate in a networked or distributed environment using logical connections to one or more other remote computers and/or other devices, including a fabrication device 1070 as described herein. The logical connections depicted in FIG. 10 include a network 1072, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has,"

"contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a method for transforming a three-dimensional model into instructions for a fabrication device, the method performed at least in part on at least one processor, the method comprising:
    computing a color value corresponding to at least a portion of at least one partition of the three-dimensional model;
    determining an amount of a colored material to deposit for a geometry corresponding to the at least one partition, the colored material corresponding to the computed color value;
    defining a plurality of addressable units for the at least one partition as voxelized data based on the determined amount of the colored material for the geometry, the voxelized data including information corresponding to the geometry, the information corresponding to the geometry including color information, material information, lighting information, and texture information; and
    generating an instruction set comprising coordinated instructions corresponding to a controller using the voxelized data to fabricate the at least one partition, the coordinated instructions comprising inserting a first colored plastic filament and a second colored plastic filament into a mixing chamber to generate the colored material, wherein the controller controls the fabrication device to fabricate the at least one partition.

2. The method of claim 1, wherein the coordinated instructions further comprise:
    instructions for moving a tool head according to at least one tool path:
    instructions for depositing an appropriate amount of the colored material: and
    instructions for transitioning between the colored material and a second colored material during color changes.

3. The method of claim 1 wherein the lighting information includes at least one of luminosity values or reflection/refraction ratios, and further comprising:
    adjusting the color value to produce at least one lighting effect based on the lighting information.

4. The method of claim 1 further comprising identifying a color change within the at least one partition or a color change between one or more partitions of the three-dimensional model.

5. The method of claim 1 further comprising:
    identifying areas of the geometry for depositing a transitional material.

6. The method of claim 1 further comprising:
    communicating an instruction of the instruction set to the fabrication device, the instruction configured to cause the fabrication device to identify a color change and deposit the colored material into at least one or more of the following: a purge structure, a support structure, and an infill area.

7. The method of claim 1, wherein generating the coordinated instruction set further comprises setting a positive rate or a negative rate for inserting the first and second colored plastic filaments into the mixing chamber.

8. The method of claim 1, wherein generating the coordinated instruction set further comprises setting a positive rate or a negative rate for extruding the colored material through a nozzle.

9. The method of claim 1, wherein generating the coordinated instruction set further comprises adding to the three-dimensional model one or more of the following: a support structure and a purge structure.

10. The method of claim 1, wherein computing the color value further comprises generating instructions for mixing the first and second colored plastic filaments with a third plastic filament, the third plastic filament having a degree of transparency.

11. A fabrication device comprising:
a first mechanism comprising a set of movable components;
a second mechanism configured to deposit a colored material for fabricating a three-dimensional object:
a fabrication manager configured to generate instructions for actuating the first mechanism and the second mechanism, and further configured to identify a plurality of addressable units and define the plurality of addressable units as voxelized data, the voxelized data including individual information for an individual addressable unit, the individual information including color information, material information, lighting information, and texture information;
measure luminosity of the three-dimensional object based on an interaction of light with a surface of the three-dimensional object; and
a controller coupled to the first mechanism and the second mechanism and configured to receive the instructions from the fabrication manager and execute the instructions, wherein actuating the first mechanism causes the first mechanism to move according to a three-dimensional geometry, and wherein actuating the second mechanism causes the second mechanism to change the colored material corresponding to color values of the three-dimensional geometry.

12. The fabrication device of claim 11, wherein the second mechanism comprises a motor driven carousel supporting a plurality of vats, the plurality of vats comprising one or more vats for colored resins or resins of different properties and a cleaning vat for removing uncured resin from the three-dimensional object being fabricated.

13. The fabrication device of claim 11, wherein the second mechanism comprises a tool for managing ultra-violet light application duration and an intensity order to create a stippling pattern representing shades of color.

14. The fabrication device of claim 13 further comprising a control unit comprising the fabrication manager, the fabrication manager further configured to:

partition a three-dimensional model into layers;
decompose layers into the voxelized data comprising the color values; and
generate a coordinated instruction set corresponding to a mixture of colored materials and an application of the mixture when fabricating the three-dimensional object.

15. The fabrication device of claim 14, wherein the control unit is configured to generate instructions to cause the fabrication device to remove uncured resin from the three-dimensional object being fabricated using a spray or a dip with agitation.

16. The fabrication device of claim 11, wherein the second mechanism further comprises a chamber for blending colored materials into the multi-colored material.

17. The fabrication device of claim 16, wherein the second mechanism further comprises an extruder configuration comprising a head having a rifled nozzle.

18. One or more computer storage devices having computer-executable instructions, which upon execution perform operations comprising:
decomposing a layer of a three-dimensional model into a plurality of geometric elements;
defining a plurality of addressable units in the layer, including generating voxelized data for the plurality of addressable units, wherein a set of voxelized data for a respective addressable unit comprises a color value, a material value, a texture value, and a lighting value, wherein the addressable unit represents a minimum amount of a colored material capable of being deposited by a fabrication device on at least a portion of a respective geometric element of the plurality of geometric elements, the respective geometric element being associated with the respective addressable unit, the colored material comprising a combination of two or more materials;
storing the color value in respective addressable units; and
generating an instruction set for depositing the colored material represented by the respective addressable units, wherein the fabrication device uses the generated instruction set for the depositing of the colored material.

19. The one or more computer storage devices of claim 18 having further computer-executable instructions comprising:
generating voxelized data from a three-dimensional mesh model and texture information, including mapping each polygon face to the texture information, and mapping each vertex of a polygon face to coordinates within the texture information;
generating the voxelized data from lighting information; and
computing the color values using the voxelized data.

20. The one or more computer storage devices of claim 19 having further computer-executable instructions comprising:
converting the color values into a halftone pattern appropriate for resin curing properties.

* * * * *